United States Patent [19]

Carp et al.

[11] 4,433,390

[45] Feb. 21, 1984

[54] POWER PROCESSING RESET SYSTEM FOR A MICROPROCESSOR RESPONDING TO SUDDEN DEREGULATION OF A VOLTAGE

[75] Inventors: Ralph W. Carp, Newport News; Danny O. Wright, Grafton, both of Va.

[73] Assignee: The Bendix Corporation, Southfield, Mich.

[21] Appl. No.: 288,591

[22] Filed: Jul. 30, 1981

[51] Int. Cl.³ ............................ G06F 9/00; G06F 11/00
[52] U.S. Cl. ............................ 364/900; 307/200 A; 307/238.3; 365/226; 365/228
[58] Field of Search ... 364/200 MS File, 900 MS File, 364/483; 365/228, 226, 227; 307/200 A, 200 B, 238.3

[56] References Cited

U.S. PATENT DOCUMENTS

| | | | |
|---|---|---|---|
| 3,562,555 | 2/1971 | Ahrons | 307/238 |
| 3,624,617 | 11/1971 | Putterman | 364/200 |
| 3,725,675 | 4/1973 | Olsen | 307/238 |
| 3,735,151 | 5/1973 | Frederiksen et al. | 307/235 R |
| 3,894,247 | 7/1975 | De Jong | 307/208 |
| 3,950,654 | 4/1976 | Broedner et al. | 307/208 |
| 3,979,610 | 9/1976 | Gordon | 307/297 |
| 4,096,560 | 6/1978 | Footh | 364/200 |
| 4,143,283 | 3/1979 | Graf et al. | 307/66 |
| 4,234,920 | 11/1980 | Van Ness et al. | 364/200 |
| 4,245,150 | 1/1981 | Driscoll et al. | 235/92 FP |
| 4,245,308 | 1/1981 | Hirschman et al. | 364/200 |
| 4,375,663 | 3/1983 | Arcara et al. | 364/200 |
| 4,388,706 | 6/1983 | Butler | 365/226 |
| 4,394,702 | 7/1983 | Boothe | 361/92 |

OTHER PUBLICATIONS

Patents Abstracts of Japan, vol. 4, #90 (P-17) (572), 27th Jun. 1980, p. 155P17–JP A 55 53717, 19–04–80.

*Primary Examiner*—James D. Thomas
*Assistant Examiner*—Archie E. Williams
*Attorney, Agent, or Firm*—Russel C. Wells; Markell Seitzman

[57] ABSTRACT

A power processing circuit operatively and electrically connected to one regulated supply (16) voltage responds through a comparator means (24) and a monitor means (26) to generate a reset pulse (84) to a microprocessor (28) whenever the regulated supply voltage starts to go out of regulation. The comparator means functions both as a control circuit to maintain regulation as well as a comparator to determine when the base current of the pass transistor (52) begins to saturate the pass transistor. The monitor means (26) responding to this condition generates a minimum time length reset pulse to the microprocessor.

4 Claims, 2 Drawing Figures

POWER PROCESSING RESET SYSTEM FOR A MICROPROCESSOR RESPONDING TO SUDDEN DEREGULATION OF A VOLTAGE

This invention is directed to nonlinear solid state microprocessor circuits in general and more particularly to safety and protection of such circuits with undervoltage response fault sensing means.

In the field of automotive electronics, the use of microprocessors, such as the Motorola 6800 series, is becoming more extensive. In such systems, the power supply used for the microprocessor is basically the vehicle battery which is electrically connected as an input to a regulated power supply within the circuitry contained in the Electronic Control Unit (ECU), in which the microprocessor is a resident. It is a requirement of all microprocessors to provide the capability of having a reset circuit to reset or "zero" the microprocessor at predetermined times in its operation. It has been found that in the environment for automotive electronics, it is possible to have very short periods, on the order of nanoseconds, of power interruption on the battery line, such as that caused by bad contacts in the ignition switch, a relay or some other device which would cause a momentary interrupt on the power line. Such momentary interrupts may have the effect of causing the microprocessor to jump out of synchronization with its processing with the end result being that the information from the microprocessor is "garbage".

The advantage of this invention is to immediately sense when any one of the voltages in a regulated power supply starts to go below its regulated level and when that happens then cause a reset signal to be generated to the microprocessor to reset the microprocessor so that the processing by the microprocessor does not create garbage. Even though such interruptions may be on the order of a nanosecond, it is necessary in most microprocessors that the reset signal appear for a minimum fix period of time, milliseconds, in order to effect a reset of the microprocessor.

The advantage of this invention is to immediately sense the dip in a regulator voltage and generate a minimum time length reset pulse to the microprocessor. The circuitry described and claimed herein will sense a particular voltage before the voltages of the power supply become critical so that the microprocessor does not process data as instructions and instructions as data, therefore generating control signals to the engine causing erratic engine behavior, garbage. In most power supplies for microprocessors that are operated from a battery, the power supplies are so designed that as the battery ages and the voltage output from the battery decreases, the regulated voltage out of the power supplies will still be maintained at a predetermined level. In the particular power supply described in this application, one such regulated voltage is five volts and a typical battery voltage is twelve to fourteen volts and the five volt supply will maintain regulation with a battery voltage down to 5.5 volts.

DESCRIPTION OF THE INVENTION

Figure 1:
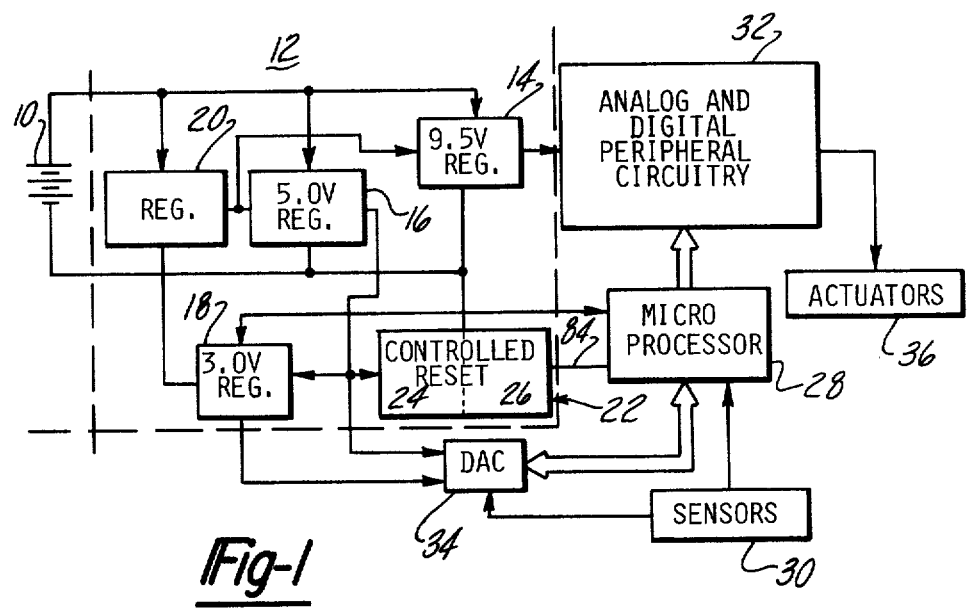
FIG. 1 is a block diagram of a microprocessor-based control system.

Referring to the figures by characters of reference there is illustrated in FIG. 1 a block diagram of an overall microprocessor system such as may be found in a control system for an automotive internal combustion engine. As illustrated, the main source of power is a battery 10 which is connected to a power processing circuit 12 having a 9.5 volt regulated supply 14, a 5.0 volt regulated supply 16, a 3.0 volt regulated supply 18, a voltage regulator 20 and a controlled reset circuit 22 comprising a comparator means 24 and a monitor means 26. The voltage regulator 20 typically regulates at a voltage below the regulated voltages and is used in the internal workings of the power processing circuit 12 for controlling the regulation of the power supply.

Electrically and operatively connected to the power processing circuit 12 is a microprocessor 28 such as a Motorola 6801. The microprocessor 28 receives inputs from several sensors 30 responding to various engine operator parameters and generates output signals controlling the analog and digital peripheral circuitry 32. As illustrated in FIG. 1, some of the signals from the sensors may be supplied to a digital to analog converter 34 which typically interfaces between a real time analog sensor and the microprocessor 28. The analog and digital peripheral circuitry 32 controls several actuators 36 for operating the engine.

In addition the controlled reset circuit 22 is electrically and operatively connected to the microprocessor 28 in a manner to be described and explained below. In description of the preferred embodiment of the controlled reset circuit 22 of FIG. 1, we will mainly be concerned with one of the voltage regulated supplies and the voltage regulator 20.

Figure 2:
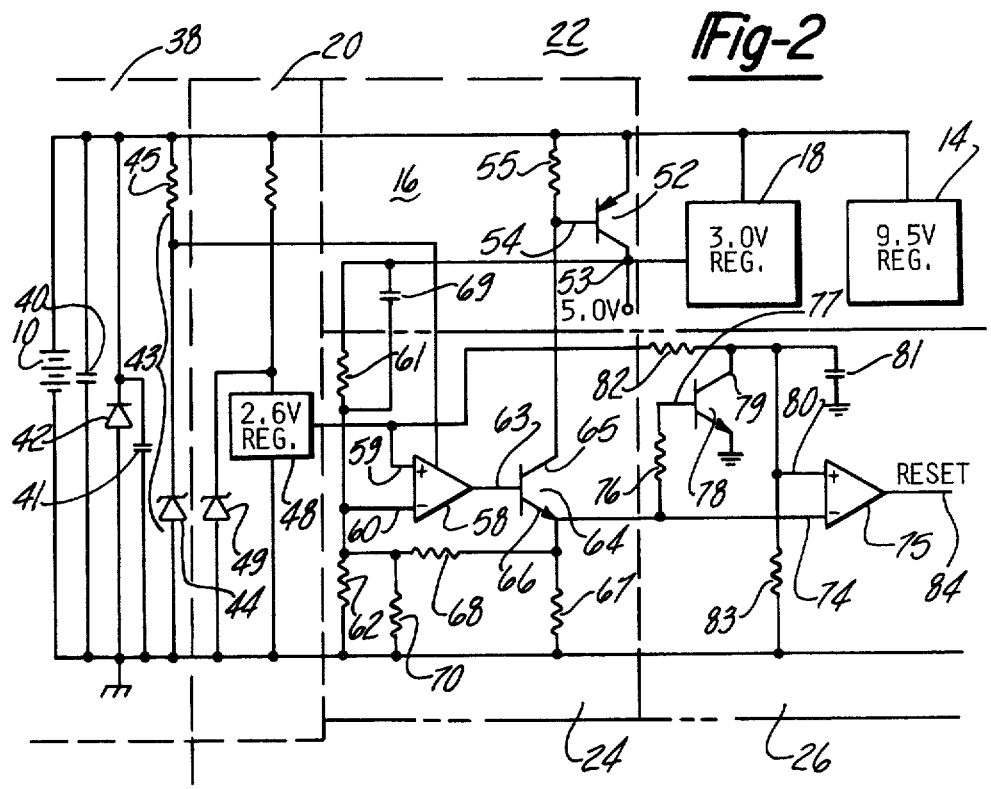
FIG. 2 is an electrical schematic of a portion of the power processing system, more particularly directed to the preferred embodiment of the reset circuit.

Referring to FIG. 2 there is shown in electrical schematic form a preferred embodiment of the controlled reset circuit 22 operatively connected to the battery 10. As illustrated in FIG. 2, the battery circuit 38 comprises the battery 10 and one or more filtering circuits. The filtering circuits comprise capacitors 40 and 41 and diodes 42 connected across the terminals of the battery in order to remove any voltage spikes that may be on the battery lines. There is illustrated in the battery circuit 38, a regulated supply voltage 43 which is used to operate several of the electronic components of the circuit. In particular this voltage is generated from a 4.7 volt zener diode 44 which is supplied current through a 200 ohm resistor 45 from the battery for generating the regulated voltage at the cathode of the zener diode 44.

The voltage regulator 20 generates a voltage which is below the regulated supply voltages and which functions to control the regulation of the power processing circuit 12. In the present embodiment, the voltage regulator 48 is a solid state voltage regulator, as may be secured from Texas Instruments having part number UA 78L02. The regulator 48 has an output which is 2.6 volts as long as the input from the battery 10 is a voltage greater than 2.6 volts. The criteria for the voltage regulator supply 20 is that it be a steady fixed voltage which does not vary as long as the voltage applied to it is greater. Connected across the regulator 48 is a high voltage zener diode 49 functioning as a shunt protective circuit to protect the regulator 48 from voltage spikes which may appear due to operations of motors, solenoids and other electrical systems connected to the battery.

As previously indicated, the schematic of FIG. 2 shows in detail only one of the voltage regulated supplies and its corresponding control circuit. In particular, the supply illustrated is the 5.0 volt regulated supply 16 which comprises a power transistor 52 electrically connected through its emitter-collector circuit between the battery 10 and the 5.0 volt output terminal 53 which is connected to the electrical load to be regulated (not shown). The control or base lead 54 from the transistor 52 is electrically connected through a resistor 55 to the battery. More particularly, this is a pass PNP transistor 52 with the emitter lead connected to the battery. In the preferred embodiment the resistor is a 600 ohm resistor and the transistor 52 is 2N6107.

It is a function of the power transistor to provide a sufficient voltage drop across the emitter-collector circuit such that the voltage at the collector 53 in this particular circuit is always 5.0 volts. Thus, as the battery voltage changes the voltage drop across the transistor 52 will likewise change and in a same manner as the electrical load in the collector circuit changes so will the voltage drop across the transistor 52 change but the collector should always remain at 5.0 volts.

The base lead 54 of the transistor 52 is electrically connected to the control circuit or comparator circuit 24 which functions to regulate the flow of current through the power transistor 52 to maintain regulation of the voltage at the collector 53 of the power transistor.

The comparator means 24 as illustrated in FIG. 2 comprises an operational amplifier 58, LM 2901 supplied from National Semiconductor, having its noninverting input 59 electrically connected to the 2.6 volt regulator 48 and its inverting input 60 is connected to the junction in a voltage divider network comprising a pair of resistors 61 and 62 electrically connected from the 5.0 volt regulated terminal 53 to ground or the return line of the battery 10. The output of the operational amplifier 58 is electrically connected to the base 63 of a control transistor 64 which in the preferred embodiment is an NPN transistor, 2N4287, having its collector 65 electrically connected to the base 54 of the power transistor 52 and its emitter 66 electrically connected through an emitter resistor 67 to ground. In addition a feedback resistor 68 is connected between the emitter of the transistor 64 and the inverting input 60 of the operational amplifier 58. Also as shown in this circuit is a capacitor 69 connected in parallel with one resistor 61 of the voltage divider and a trim resistor 70 electrically connected in parallel with the other resistor 62 of the voltage divider.

When the 5.0 volt regulator circuit 16 is initially set up, the output of the operational amplifier 58 is a voltage signal controlling the control transistor 64 for maintaining 5.0 volts at the collector 53 of the power transistor 52 under a given current load. The voltage at the midpoint of the voltage divider which is connected to the inverting input 60 of the operational amplifier 58 is adjusted by means of the trim resistor 70 to equal the voltage of the voltage regulator 48. Therefore, as the electric load connected to the collector 53 of the power transistor 52 varies or changes so will the voltage input at the inverting input 60 of the operational amplifier 58 thus controlling the control transistor 64 to supply more or less base current to the power transistor 52. The feedback resistor 68 is connected in a negative feedback manner to provide stability to the circuit.

Electrically connected to the emitter 66 of the control transistor 64 is the monitor means 26 comprising a monostable pulse generating circuit which operates to generate a reset pulse when the control transistor 64 is saturated and to maintain the reset pulse for a minimum period of time. The emitter resistor 67 in the control transistor circuit functions both in the comparator means 24 and also in the monitoring means 26.

The emitter 66 of the control transistor 64 is electrically connected to an inverting input 74 of a second operational amplifier 75 also an LM2901, and through a resistor 76 to the base 77 lead of a transistor switch 78. A preferred embodiment of the transistor switch 89 is an NPN transistor identified as a 2N3904. The emitter of the switch is grounded and the collector 79 is electrically connected to the noninverting input 80 of the second operational amplifier 75. The collector 79 is also connected through a timing capacitor 81 to ground and to the junction of a voltage divider 82 and 83 electrically connected between the output of the voltage regulator 48 and ground. The output of the operational amplifier 75 is a reset pulse, reset 84, which is supplied to the microprocessor 28 and in particular to pin six of a 6801 microprocessor.

Electrically connected to the collector 53 of the power transistor 52 is the 3.0 volt voltage regulated supply 18 which is shown in block diagrammatic form in FIG. 2. In a similar manner to the 5.0 volt regulated supply 16, the 9.5 volt regulated supply 14 in the preferred embodiment is configured with the component values different to account for the different voltage. The controlled reset circuit 22 of the present invention, in the preferred embodiment, operates only from the 5.0 volt regulated supply 16 although it could operate from any or all of the regulated supplies.

In normal operation, a check of the voltages at several places in the 5.0 volt regulated supply 16 would find the base voltage of the power transistor 52 approximately 0.6 volts below that of its emitter and its collector at 5.0 volts. In a similar manner the voltage drop across the base-emitter circuit of the control transistor 64 is about 0.6 volts with its emitter 66 about 0.5 volts. The junction of the voltage divider, which is connected to the inverting input 60 of the first operational amplifier 58 is 2.6 volts when the collector of the power transistor 52 is 5.0 volts. During the operation of the 5.0 voltage regulated circuit 16, which operation is not unique to this particular circuit, as the electrical load or the current through the power transistor 52 changes the control transistor 64 under the influence of the first operational amplifier 58 will cause more or less base current to be supplied to the power transistor 52. As long as the 5.0 volt regulated supply 16 is operating properly and the 5.0 volt line is not below 5.0 volts, the voltage drop across the emitter resistor 67 in control transistor circuit is substantially 0.5 volts. The negative feedback resistor 68 functions to maintain stability in the circuit means 24. In the monitor means 26, the capacitor 81 is charged through the current limiting resistor 82 in the voltage divider circuit so that the voltage at the collector 79 of the transistor switch is at a greater voltage than the voltage at the inverting input 74 of the operational amplifier 75.

When there is a drop in the 5.0 volt line, this is an indication to the power processor circuit 12 that the microprocessor 28 is in danger of generating "garbage". At this time, the output of the operational amplifier 58 in the comparator means 24 goes more positive tending to supply more current to the control transistor 64 and thus driving it into saturation. The current through the control transistor 64 is fed to the emitter resistor 67 causing the emitter voltage of the control transistor 64 to rise. This increase in voltage is supplied to the base 77 of the transistor switch 78 in the monitor means 26 which immediately turns it on causing the capacitor 81 to be immediately discharged to ground. Ground is also applied to the noninverting input 80 of the second operational amplifier 75 causing the output thereof to go low generating a reset pulse 84. As long as the transistor switch 78 remains on, the capacitor 81 remains discharged. However, when the load voltage recovers or the battery voltage increases such that the 5.0 volt regulated supply 16 returns to 5.0 volts, the voltage drop across the emitter resistor 67 in the control transistor circuit returns back to 0.5 volts which operates to open the transistor switch 78 by turning the transistor off. The capacitor 81 charges through its current limiting resistor 82 with a predetermined time constant and at a predetermined voltage causes the noninverting input 80 of the operational amplifier 75 to become positive with respect to the inverting input 74. This will turn off the reset pulse 84 and turn on the microprocessor 28. Thus it can be seen regardless of the amount of time which the 5.0 volt line is below 5.0 volts, the reset pulse 84 is at least a minimum time period long as determined by the timeing capacitor 81 in the monitor means 26.

In summary, when the voltage on the emitter resistor 67 in the control transistor circuit rises above its nominal voltage the feedback resistor 68 causes the input on the inverting input 60 of the operational amplifier 58 to become positive with respect to the voltage on the noninverting input 59. This causes the output of the operational amplifier 58 to drive the control transistor 64 harder. As the 5.0 volt line seeks to recover, the amount of base current in power transistor 52 reduces, causing the emitter resistor 67 in the control circuit to have less of a voltage drop across it. Through the feedback resistor 68, the operational amplifier 58 starts to control the control transistor 64 bringing the system back in line. As the emitter voltage on the control transistor 64 returns to normal, the transistor switch 78 is turned off and the timing capacitor 81 charges.

Initializing the microprocessor circuit particularly in an automotive environment by turning the ignition circuit on, this reset circuit automatically functions causing the reset pulse 84 to be supplied to the microprocessor 28. At the beginning of the initializing operation, the timing capacitor 81 is discharged and for the time period it takes to charge, the reset pulse is supplied to the microprocessor.

As previously stated, the monitor means 26 is basically a one-shot timer having a minimum time but an unlimited maximum time for the pulse output. It is a requirement of the microprocessor 28 that the reset pulses are at least on the order of 50 milliseconds long. In the particular circuit above, the various components operate much faster and will respond in fractions of that time to generate the reset pulse. The function of the capacitor 69 in the comparator means 24 which is across one resistor 61 in the voltage divider, is to slow up the pulse being supplied to the inverting input 60 of the operational amplifier 58 upon turn on. As the 5.0 volt line comes from 0 to 5 volts, the capacitor 69 slows down the response at the operational amplifier 58 to prevent voltage overshoot on the 5.0 volt line and thereby possibly damaging the microprocessor 28.

There has thus been described a power processing circuit for generating a reset pulse to a microprocessor whenever one of the voltage lines in a regulated power supply begins to lose regulation. The reset pulse will remain on for at least a minimum period of time requested by the microprocessor and will remain on as long as the voltage sensed in the regulated supply is out of regulation.

What is claimed is:

1. A power processing reset system for a microprocessor responding to a sudden deregulation of a voltage, the system comprising:
    a battery for providing various voltage and current levels;
    at least one voltage regulated supply electrically connected to said battery and said supply operative to regulate its output voltage over a predetermined range of battery voltages;
    a voltage regulator electrically connected to the battery and operative to produce a fixed output voltage that is less than said output voltage from said voltage regulated supply;
    comparator amplifier means responsive to said fixed output voltage and a ratiometrically derived voltage from said one voltage regulated supply and operable to generate a control signal whenever said ratiometrically derived voltage is not equal to said fixed output voltage said control signal for controlling said one voltage regulated supply to equalize said ratiometrically derived voltage and said fixed output voltage; and
    monitor means responding to said control signal to generate a minimum time based reset pulse to reset the microprocessor when said voltage regulated supply begins to fall below its regulated output when said ratiometrically derived voltage remains less than said fixed output voltage.

2. In the power processing system according to claim 1 wherein said voltage regulated supply comprises a power transistor electrically connected between said battery voltage and the electrical load to be regulated and having its control lead responsive to said control signal from said comparator means for regulating the flow of current through said power transistor to maintain said output voltage.

3. In the power processing system according to claim 2 wherein said comparator means comprises:
    an operational amplifier wherein one input is electrically connected to receive said fixed output voltage and a second input is electrically connected through a voltage divider to the output voltage of said voltage regulated supply and operable to generate a pulse output when said inputs are at different voltage levels; and
    a transistor amplifier electrically connected to the output of said amplifier and responsive to said output signal to control said voltage regulated supply for supplying control current to said power transistor.

4. In the power processing system according to claim 3 wherein said monitor means comprises a monostable pulse circuit adapted to generate a pulse when said transistor amplifier is saturated and maintains said pulse at least as long as said amplifier remains saturated.

* * * * *